US012615703B2

(12) United States Patent
Nielsen et al.

(10) Patent No.: US 12,615,703 B2
(45) **Date of Patent: *Apr. 28, 2026**

(54) LIGHT FIXTURE SYSTEM WITH HIGH-RESOLUTION DIMMING

(71) Applicant: HARMAN INTERNATIONAL INDUSTRIES, INCORPORATED, Stamford, CT (US)

(72) Inventors: Kasper Nielsen, Brabrand (DK); Martin Degn Kristensen, Randers (DK)

(73) Assignee: Harman Professional Denmark APS, Aarhus N (DK)

( * ) Notice: Subject to any disclaimer, the term of this patent is extended or adjusted under 35 U.S.C. 154(b) by 57 days.

This patent is subject to a terminal disclaimer.

(21) Appl. No.: 18/653,665

(22) Filed: May 2, 2024

(65) Prior Publication Data

US 2024/0284576 A1 Aug. 22, 2024

Related U.S. Application Data

(63) Continuation of application No. 18/333,742, filed on Jun. 13, 2023, now Pat. No. 12,004,281, which is a continuation of application No. 17/525,028, filed on Nov. 12, 2021, now Pat. No. 11,974,379.

(51) Int. Cl.

| | |
|---|---|
| ***H05B 45/10*** | (2020.01) |
| ***H05B 45/325*** | (2020.01) |
| ***H05B 45/327*** | (2020.01) |
| ***H05B 47/155*** | (2020.01) |

(52) U.S. Cl.
CPC ........... *H05B 47/155* (2020.01); *H05B 45/10* (2020.01); *H05B 45/325* (2020.01); *H05B 45/327* (2020.01)

(58) Field of Classification Search
CPC ...... H05B 45/10; H05B 45/30; H05B 45/325; H05B 45/327; H05B 47/10; H05B 47/155
See application file for complete search history.

(56) References Cited

U.S. PATENT DOCUMENTS

| | | | |
|---|---|---|---|
| 7,788,833 | B2 | 9/2010 | Hauck et al. |
| 9,521,721 | B2 | 12/2016 | Beczkowski |
| 9,743,476 | B2 | 8/2017 | Yoneoka et al. |
| 9,821,705 | B2 | 11/2017 | Levasseur |
| 9,933,137 | B2 | 4/2018 | Kjeldsen et al. |
| 10,292,233 | B1 | 5/2019 | Udavant et al. |
| 10,816,939 | B1 | 10/2020 | Coleman |

(Continued)

FOREIGN PATENT DOCUMENTS

| | | | |
|---|---|---|---|
| EP | 3 911 124 | A1 | 11/2021 |
| WO | 2010/145658 | A1 | 12/2010 |

*Primary Examiner* — Jimmy T Vu
(74) *Attorney, Agent, or Firm* — Artegis Law Group, LLP

(57) ABSTRACT

Techniques for high-resolution dimming include a light fixture having a plurality of light sources arranged in a plurality of groups, wherein each group comprises one or more light sources. The plurality of groups are controlled so that each of the groups is repeatedly switched on and off according to a repeating pattern, the repeating pattern including at least three different combinations of which of the plurality of groups is switched on and which of the plurality of groups is switched off. Each of the at least three different combinations is repeated at least once every 1/10 s.

20 Claims, 10 Drawing Sheets

(56) References Cited

U.S. PATENT DOCUMENTS

| | | | | |
|---|---|---|---|---|
| 12,004,281 | B2 * | 6/2024 | Nielsen ................ | H05B 45/325 |
| 2004/0257007 | A1 | 12/2004 | Lys et al. | |
| 2006/0022214 | A1 | 2/2006 | Morgan et al. | |
| 2007/0024461 | A1 | 2/2007 | Pederson et al. | |
| 2008/0297068 | A1 | 12/2008 | Koren et al. | |
| 2010/0141162 | A1 | 6/2010 | Matsumoto et al. | |
| 2010/0176733 | A1 | 7/2010 | King | |
| 2012/0249013 | A1 | 10/2012 | Valois et al. | |
| 2014/0218969 | A1 | 8/2014 | Kjaer et al. | |
| 2015/0008829 | A1 | 1/2015 | Lurie et al. | |
| 2015/0342002 | A1 | 11/2015 | Jørgensen | |
| 2016/0069540 | A1 | 3/2016 | Kjeldsen et al. | |
| 2017/0231040 | A1 | 8/2017 | Ido | |
| 2017/0325296 | A1 | 11/2017 | Saes et al. | |
| 2018/0027637 | A1 | 1/2018 | Kurt et al. | |
| 2018/0035510 | A1 | 2/2018 | Doheny et al. | |
| 2020/0367335 | A1 | 11/2020 | Serra et al. | |
| 2021/0360756 | A1 * | 11/2021 | Gadegaard ............. | H05B 45/22 |

* cited by examiner

LIGHT FIXTURE SYSTEM WITH HIGH-RESOLUTION DIMMING

CROSS-REFERENCE TO RELATED APPLICATIONS

The present application is a continuation of United States application titled "LIGHT FIXTURE SYSTEM WITH HIGH-RESOLUTION DIMMING," filed on Jun. 13, 2023, and having Ser. No. 18/333,742, which is a continuation of United States application titled "LIGHT FIXTURE SYSTEM WITH HIGH-RESOLUTION DIMMING," filed on Nov. 12, 2021, and having Ser. No. 17/525,028, issued as U.S. Pat. No. 11,974,379. The subject matter of these related applications is hereby incorporated by reference.

TECHNICAL FIELD

The present disclosure relates to a light fixture system, and more particularly relates to a dimmable light fixture system, and furthermore relates to a corresponding controller for controlling a light fixture and a corresponding method of operating a light fixture.

BACKGROUND

Light fixture system may be utilized for creating various light effects and/or mood lighting in connection with, e.g., concerts, live shows, TV shows, sport events or as architectural installation light fixture systems creating various effects.

An intensity of light emitted from a light fixture system may be dimmable in order to comply with a desired (optionally sub-maxium) intensity. This may for example be achieved with pulse-width modulation (PWM). However, due to the finite period of a minimum pulse width (for technical reasons), the minimum intensity is similarly finite and larger than zero. Thus, the intensity is changed in discrete steps, and there is in particular a discrete step between the minimum non-zero intensity (such as the intensity corresponding to each light source in the light fixture system being driven with minimum, non-zero intensity) and zero intensity (such as each light source in the light source system being switched off).

Hence, an improved light fixture system and more particularly a light fixture system for enabling smaller intensity steps, such as between the minimum non-zero intensity and the zero intensity and a corresponding controller and method for operating a light fixture system would be advantageous.

SUMMARY

It may be seen as an object of the present disclosure to provide an improved light fixture system and more particularly a light fixture system for enabling smaller intensity steps, such as between the minimum non-zero intensity and the zero intensity and a corresponding controller and method for operating a light fixture system. It is a further object of the present disclosure to provide an alternative to the prior art.

Thus, the above described object and several other objects are intended to be obtained in a first aspect of the disclosure by providing a light fixture system comprising:

1. A light fixture comprising
   i. a plurality of light sources arranged in a plurality of groups, wherein each group comprises one or more light sources, ii. a controller, wherein according to at least one setting of the light fixture, the controller is arranged to control the plurality of groups so that each of the groups is repeatedly switched on and off, wherein 1. at a first point in time,
   i. one or more groups are switched on, and
   ii. other one or more groups are switched off,
2. at a second point in time,
   i. one or more of the groups which were switched on at the first point in time are switched off, and
   ii. one or more of the groups which were switched off at the first point in time is switched on, and
3. at a third point in time,
   i. one or more of the groups which were switched on at the second point in time are switched off, and
   ii. one or more of the groups which were switched off at the second point in time are switched on, and wherein a period of time between the first point in time and the third point in time is equal to or less than 1/10 s, such as equal to or less than 1/20 s, such as equal to or less than 1/24 s, such as equal to or less than 1/30 s, such as equal to or less than 1/40 s, such as equal to or less than 1/48 s, such as equal to or less than 1/50 s, such as equal to or less than 1/60 s, such as equal to or less than 1/100 s, such as equal to or less than 1/200 s, such as equal to or less than 1/500 s, such as equal to or less than 1/1000 s, such a equal to or less than 1/3000 s, such as equal to or less than 1/10000 s.

The disclosure may be particularly, but not exclusively, advantageous for enabling smaller intensity steps when dimming, such as smaller perceived intensity steps by a standard human observer. By changing at the first, second and third points in time between having some groups switched on and other groups switched of an vice versa, it may for example be possible to have an average intensity corresponding to half the nominal minimum intensity (for example by having at any time every second group switched off, while every second other group is switched on), where nominal minimum intensity is understood to be an intensity corresponding to each and all groups being switched on at a minimum (PWM) intensity. Furthermore, by having the period of time between the first point in time and the third point in time being equal to or less than 1/10 seconds (s), the switching takes place so quickly that for a standard human observer, it will for all practical purposes look substantially stationary, such as look stationary. Another possible advantage of the present disclosure is that it enables effectively (in the eye of the human observer) dimming in a perceived homogeneous manner, such as for example so that all groups are perceived as being dimmed simultaneously and to the same level.

The term "light fixture" is generally understood to refer to an electrical device that contains an (electrical) light source, such as an illumination system with a light source, that provides illumination and wherein the light source and optionally one or more optical components is at least partially enclosed in a housing. The person skilled in (entertainment) light fixtures realizes that a number of light effects can be integrated into the light fixture. According to embodiments, there is presented a light fixture with one or more of a prism for prism effects, an iris for iris effects, framing blades for framing effects, frost filter for frost effects, means for dimming effects, animation wheel for animation effects, one or more gobo wheels. The (entertainment) light fixture can be controlled based on an input signal indicative of light parameters which can be indicative of a desired intensity, a target color indicating a desired color of the outgoing light, and/or a number of light effect parameters indicative of a various numbers of light effects. The (entertainment) light fixture may comprise a processor configured to control the different light effects of the light fixture based on the light parameters received by the input signal. For instance the (entertainment) light fixture may comprise the light effects and be controlled based on various parameters as described in WO2010/145658 in particular on page 4 line 11-page 6 line 9, which is incorporated by reference herein.

The term “light” is generally understood to refer to visible electromagnetic radiation, such as electromagnetic radiation with wavelengths within (both endpoints included) 380-780 nm.

The term “light source” is generally understood to refer to any source capable of emitting light, such as light emitting diode (LED) or a LASER.

It is generally understood that a group of light sources can comprise one or more light sources. It is conceiveable that a group comprises one light source only. Thus, “group” is not to be construed as excluding comprising only a single light source. It may be understood that a “group” of light sources is controlled together, such as a unity. “Group” can be used interchangeablly with “string” or “set.”

The term a controller (also referred to herein as a control device) is generally understood to refer to a device, such as a processor, capable of being operatively connected with a light fixture and controlling the light fixture. For example, the controller can be operatively connected to, e.g., power supply to light sources and/or one or more actuators for controlling a color mixing system, such as an additive color mixing system or a subtractive color mixing system.

The term “repeatedly switched on and off” is understood as is common in the art, and may in particular be understood as being switched completely on (such as to a maximum intensity, such as during the “on” time in a regular PWM interval, which may, however, be a minimum “on” time, i.e., a minimum pulse width) and completely off.

A “period of time between the first point in time and the third point in time” may be substantially equal to, such as as equal to, two regular PWM intervals (such as two regular PWM periods).

It may be understood that the controller is arranged for operating the light fixture according to the at least one setting (such as wherein the plurality of groups so that each of the groups is repeatedly switched on and off and wherein a period between points in time, such as points in time for which groups are on, respectively, off as at the first, second and third point is equal to or less than 1/10 second, such as equal to or less than 1/50 seconds) for a period spanning at least 1 second, such as at least 10 seconds, such as at least 60 seconds, such as at least 10 minutes, such as at least 1 hour.

According to a second aspect of the disclosure, there is presented a light fixture system wherein a period of time between the first point in time and the third point in time is equal to or less than 1/50 s. A possible advantage of this may be that the switching is imperceivable not only to the human eye but also videocameras and even high-speed videocameras.

According to an embodiment there is presented a light fixture system wherein each of 1. the one or more groups which are switched on at the first point in time,
2. the one or more groups which are switched on at the second point in time, and 3. the one or more groups which are switched on at the third point in time, is unique. This may be advantageous for enabling more advanced switching schemes than merely switching back and forth between two sub-settings. More advanced schemes may for example be advantageous for enabling finer resolution, such as more than doubling the dimming resolution. The term “unique” is generally understood to mean that the one or more groups which are switched on, respectively, at the first, second and third point in time are each different with respect to each of the others.

According to an embodiment there is presented a light fixture system wherein a moving average, such as a simple moving average, of the intensity of one or more of the groups, such as each of one or more or all of the groups, is substantially constant within a period of time spanning 10 seconds or more, such as 30 seconds or more, such as 60 seconds or more, such as 10 minutes or more, such as 1 hour or more, wherein the moving average is based on a sample period equal to or less than 1 second, such as equal to or less than 1/10 second, such as equal to or less than 1/50 second, such as equal to or less than 1/100 second. An advantage of this may be that it enables that the light emitted appears stable over time (such as over 10 seconds or more) for one or more of the groups, such as for a single group or for each of a plurality of groups, such as for each of all the groups.

According to an embodiment there is presented a light fixture system wherein a moving average, such as a simple moving average, of the total intensity of all of the groups is substantially constant within a period of time spanning 10 seconds or more, such as 30 seconds or more, such as 60 seconds or more, such as 10 minutes or more, such as 1 hour or more, wherein the moving average is based on a sample period equal to or less than 1 second, such as equal to or less than 1/10 second, such as equal to or less than 1/50 second, such as equal to or less than 1/100 second. An advantage of this may be that it enables that the total amount of light emitted appears stable over time (such as over 10 seconds or more), such as even if the perceived dimming level is below a level which is achieved (only) by intermittently switching of some of the groups.

According to an embodiment there is presented a light fixture system wherein according to the at least one setting, one or more or all of the groups which are switched on, such as switched on at the first point in time and/or the second point in time and/or the third point in time, have a variable intensity, and are switched on at an intensity being less than 50% of a maximum intensity, such as less than 25% of a maximum intensity, such as less than 10% of a maximum intensity, such as less than 1% of a maximum intensity, and/or a minimum intensity. The term “minimum intensity” is generally understood to refer to the time-averaged minimum intensity, such as the minimum intensity achievable with the minimum pulse width in each regular PWM period. The term “variable intensity” is generally understood to refer to a group can be switched on at different intensities, such at a plurality of different, discretized intensity levels.

According to an embodiment there is presented a light fixture system wherein according to the at least one setting, one or more or all of the groups which are switched on, such as switched on at the first point in time and/or the second point in time and/or the third point in time, have a variable intensity, and are switched on at an intensity being a minimum intensity. An advantage may be that an effective or perceived intensity is less than an intensity corresponding to each light source, such as each and all, being switched on at an intensity being a minimum intensity (where “minimum intensity" in this context is generally understood to indicate the time-averaged minimum intensity, such as the minimum intensity achievable with the minimum pulse width in each regular PWM period).

According to an embodiment there is presented a light fixture system wherein according to the at least one setting, at any time, at least one group is switched off. This may for example be in contrast with typical PWM operation where each group is "on" at least for some time during the minimum pulse width in each regular PWM period. A possible advantage is that it enables that an effective or perceived intensity being less than an intensity corresponding, e.g., to a situation wherein all groups are either switched on or switched off.

According to an embodiment there is presented a light fixture system wherein according to the at least one setting, multiple groups, such as all groups, within the plurality of groups are each controlled according to a periodic scheme. A possible advantage may be that control over each group controlled according to a period scheme is controlled, and it may be possible to control phases of the groups with respect to each other.

In an alternative embodiment, according to the at least one setting, multiple groups, such as all groups, within the plurality of groups are each controlled according to a scheme involving a random component, optionally adjusted so that a period between each group switches on and off is on average within certain limits and/or so that one or both of on and off periods are within certain limits. A possible advantage may be that it presents an alternative to the periodic scheme and/or that it mitigates issues with interference (or beat frequencies).

According to an embodiment there is presented a light fixture system wherein groups within the plurality of groups, which are each controlled according to a periodic scheme, are out-of-phase with each other. A possible advantage may be that this might go to ensure that the switching is less visible to the eye and/or to a videocamera.

According to an embodiment there is presented a light fixture system wherein groups within the plurality of groups, which are each controlled according to a periodic scheme, are having periods of the same length. A possible advantage may be that this provides a simple solution, such as simplifying providing a phase difference between the groups.

According to an embodiment there is presented a light fixture system wherein groups within the plurality of groups, which are each controlled according to a periodic scheme, are having identical functions with respect to each other. A possible advantage may be that this provides a simple solution. The term "identical functions" is generally understood to mean that for at least two groups within the plurality of groups, a controlling scheme is given by a periodical function, which is identical to the function(s) of the other group(s) within the at least two groups, except optionally for a non-zero phase shift, such as as a constant non-zero phase shift.

According to an embodiment there is presented a light fixture system wherein an intensity of each group of light sources is controlled via pulse-width modulation. Pulse-width modulation (PWM) is understood as is common in the art.

According to an embodiment there is presented a light fixture system wherein a total intensity of the plurality of groups is substantially constant according to the at least one setting, such as constant, across regular intervals of the pulse width modulation. A possible advantage is that a more constant (in time) intensity is achieved. The term "regular interval of the pulse width modulation" is understood as is common in the art, such as the period of pulse width modulation, such as said period in time corresponding to a period separating the start of consecutive pulses (being as closely spaced as possible). The term "substantially constant" may be understood to mean that a standard deviation is less than 10%, such as less than 1%, such as less than 0.1%, than an average value. Alternatively, "substantially constant" may be understood to mean that a total intensity in each regular interval deviates less than 10%, such as less than 1%, such as less than 0.1%, from an average value (where the percentage values are understood to be absolute values). In an embodiment, a total intensity of the plurality of groups is constant, such as constant, in each regular interval of the pulse width modulation with respect to other regular intervals. In embodiments, the average and/or constant intensity corresponds to a value different with a respect to an (integer) multiple of the intensity corresponding to the smallest possible pulse width for each of the plurality of groups. An advantage of this may be that it enables total intensities differing from the total intensity when all groups are on at a given (PWM discretized level). In embodiments, the average and/or constant intensity corresponds to a value lower than a nominal minimum intensity corresponding to the smallest possible pulse width for each of the plurality of groups. An advantage of this may be that it enables dimming to below an otherwise achievable (nominal) minimum dimming level.

According to an embodiment there is presented a light fixture system wherein each group of light sources is individually controlled via dedicated pulse-width modulation control. A possible advantage may be that this provides individual PWM control over each group, which may for example enable having different intensities for different groups (which may for example be relevant according to at least one other setting).

According to an embodiment there is presented a light fixture system wherein each group of light sources is individually controlled via dedicated switches in combination with a general pulse-width modulation control, such as a general pulse width modulation control controlling a pulsewidth of each group in the plurality of groups. For example, a general pulse-width modulation control is controlling a pulse-width of all groups, but only groups supplied with power via dedicated switches, i.e., a dedicated switch for each group, will actually be emitting light in the corresponding period, A possible advantage may be that this enables individual control (albeit not individual PWM control) of each group, yet necessitating only one PWM controller (or PWM timer). Another possible advantage may be that for the groups supplied with power, synchronous operation is achieved in a simple manner.

According to an embodiment there is presented a light fixture system wherein the light fixture is a moving head. A moving head may be understood to be a light fixture with rotating means, such as actuators, for rotating a direction of light emitted from the light fixture around one or two axes being orthogonal to the direction of light emitted from the light fixture. An example of such embodiment may be given by a moving head, such as described in WO2010/145658A1 (see for example FIGS. 1-2 and accompanying description), which is incorporated by reference herein.

According to an embodiment, there is presented a light fixture, such as a moving head, comprising one or more actuators, such as electric motors, such as stepper motors and/or servo motors, for changing a direction of light emitted from the light fixture, such as for rotating a direction of light emitted from the light fixture around one or two axes being orthogonal to the direction of light emitted from the light fixture. A possible advantage is that the direction of light can be changed in an automated manner, which may in particular be relevant for, e.g., theatre lighting, e.g., for stage performances. An example of such embodiment may be given by a moving head, such as described in WO2010/145658A1 (see for example FIGS. 1-2 and accompanying description), which is incorporated by reference herein.

According to an embodiment there is presented a light fixture system wherein the plurality of light sources (244) are capable of delivering in total at least 5 klm, such as at least 10 klm (i.e., ten thousand lumen or 10 kilolumen), such as at least 20 klm, such as at least 30 klm, such as at least 40 klm.

According to an embodiment there is presented a light fixture system wherein a luminance of each light source of the plurality of light sources (103) is above 250 $lm/mm^2$, such as above 300 $lm/mm^2$, such as above 400 $lm/mm^2$, such as above 450 $lm/mm^2$, such as above 500 $lm/mm^2$. According to an embodiment, there is presented an illumination device wherein a luminance of the second group of light sources can be driven above 250 $lm/mm^2$, such as above 300 $lm/mm^2$, such as above 400 $lm/mm^2$, such as above 500 $lm/mm^2$. For, e.g., profile light or other Etendue limited applications, source luminance may be important and relevant for how high an output can be reached for a certain size fixture. Luminance is understood to be for DC operation (not flash) and measured in lumen (lm) per square millimeter ($mm^2$).

According to a third aspect there is presented a controller for controlling a light fixture, wherein said light fixture is comprising:

1. a plurality of light sources arranged in a plurality of groups, wherein each group comprises one or more light sources, wherein according to at least one setting of the light fixture, the controller is arranged to control the plurality of groups so that each of the groups is repeatedly switched on and off, wherein at a first point in time,
- i. one or more groups are switched on, and
- ii. other one or more groups are switched off, 2. at a second point in time,
   - i. one or more of the groups which were switched on at the first point in time are switched off, and
   - ii. one or more of the groups which were switched off at the first point in time is switched on, and
3. at a third point in time,
   - i. one or more of the groups which were switched on at the second point in time are switched off, and
   - ii. one or more of the groups which were switched off at the second point in time are switched on, and wherein a period of time between the first point in time and the third point in time is equal to or less than 1/10 s, such as equal to or less than 1/20 s, such as equal to or less than 1/24 s, such as equal to or less than 1/30 s, such as equal to or less than 1/40 s, such as equal to or less than 1/48 s, such as equal to or less than 1/50 s, such as equal to or less than 1/60 s, such as equal to or less than 1/100 s, such as equal to or less than 1/200 s, such as equal to or less than 1/500 s, such as equal to or less than 1/1000 s, such a equal to or less than 1/3000 s, such as equal to or less than 1/10000 s.

The controller may be operationally connected and optionally physically connected (such as within a light fixture) with, e.g., a color mixing system, such as an additive color mixing system or a subtractive color mixing system, and/or a power supply for PWM. The control device may be embedded electronics, such as processor and memory and input/output (IO) system(s).

According to an embodiment, there is presented a controller further comprising or being operationally connected to:

a storage unit and comprising information corresponding to the calibration data.

The storage unit may be a unit comprising a suitable medium, such as a computer readable medium, such as an electronically accessible memory integrated circuit chip, such as an optical storage medium or a solid-state medium, such as an optical storage medium or a solid-state medium supplied together with or as part of other hardware, such as a Hard Disk Drive (HDD).

According to a fourth aspect there is presented a method of operating a light fixture, wherein said light fixture is comprising:

1. a plurality of light sources arranged in a plurality of groups, wherein each group comprises one or more light sources, said method comprising controlling the plurality of groups so that each of the groups is repeatedly switched on and off, wherein 1. at a first point in time,
   - i. one or more groups are switched on, and
   - ii. other one or more groups are switched off,
2. at a second point in time,
   - i. one or more of the groups which were switched on at the first point in time are switched off, and
   - ii. one or more of the groups which were switched off at the first point in time is switched on, and
3. at a third point in time,
   - i. one or more of the groups which were switched on at the second point in time are switched off, and
   - ii. one or more of the groups which were switched off at the second point in time are switched on, and wherein a period of time between the first point in time and the third point in time is equal to or less than 1/10 s, such as equal to or less than 1/20 s, such as equal to or less than 1/24 s, such as equal to or less than 1/30 s, such as equal to or less than 1/60 s, such as equal to or less than 1/100 s, such as equal to or less than 1/200 s, such as equal to or less than 1/500 s, such as equal to or less than 1/1000 s, such a equal to or less than 1/3000 s, such as equal to or less than 1/10000 s.

According to a fifth aspect there is presented a use of an light fixture system according to the first aspect for illumination.

BRIEF DESCRIPTION OF THE DRAWINGS

The various aspects according to the disclosure will now be described in more detail with regard to the accompanying figures. The figures show one way of implementing the present disclosure and is not to be construed as being limiting to other possible embodiments falling within the scope of the attached claim set.

DETAILED DESCRIPTION

Figure 1:
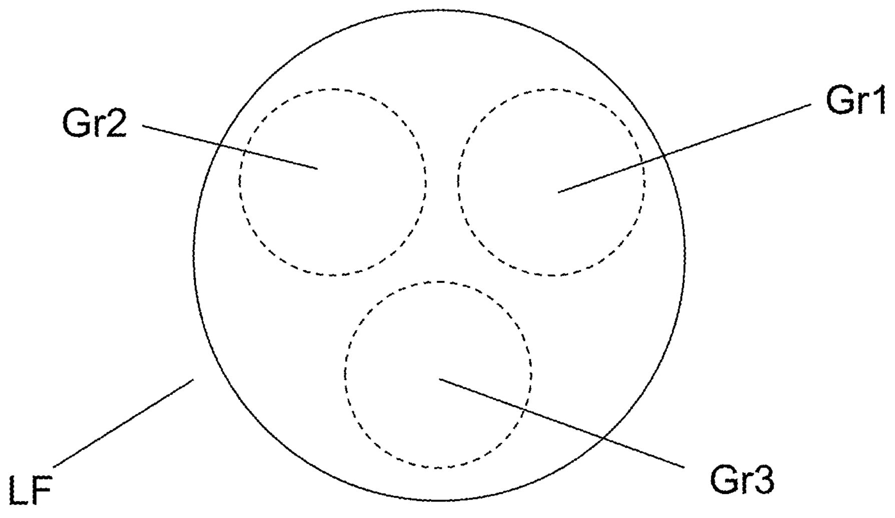
FIGS. 1 and 2 show schematics of light fixtures.

FIG. 1 shows a schematic of a light fixture LF comprising a plurality of groups of light sources, and more particularly a first group Gr1, a second group G2, and a third group Gr3. A grouping of light sources into separate groups may be carried out as described in U.S. Pat. No. 9,933,137B2, which is hereby incorporated by reference in entirety, and may in particular be carried out as described in FIG. 7C of U.S. Pat. No. 9,933,137 B2. In FIG. 1 all groups are switched off (thus no fill in the circles representing the groups).

Figure 2:
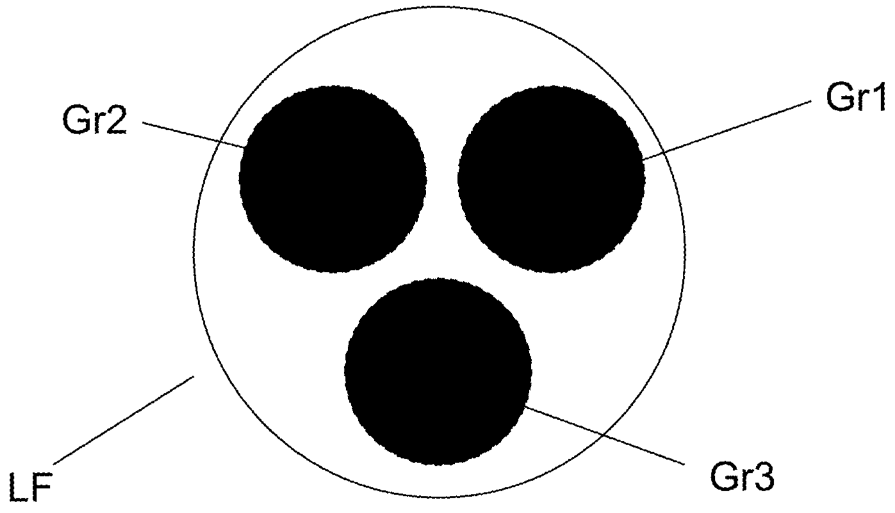

FIG. 2 shows the same light fixture LF as in FIG. 1, but in FIG. 2 all light sources are switched on (thus the black filling the circles representing of the groups).

Figure 3:
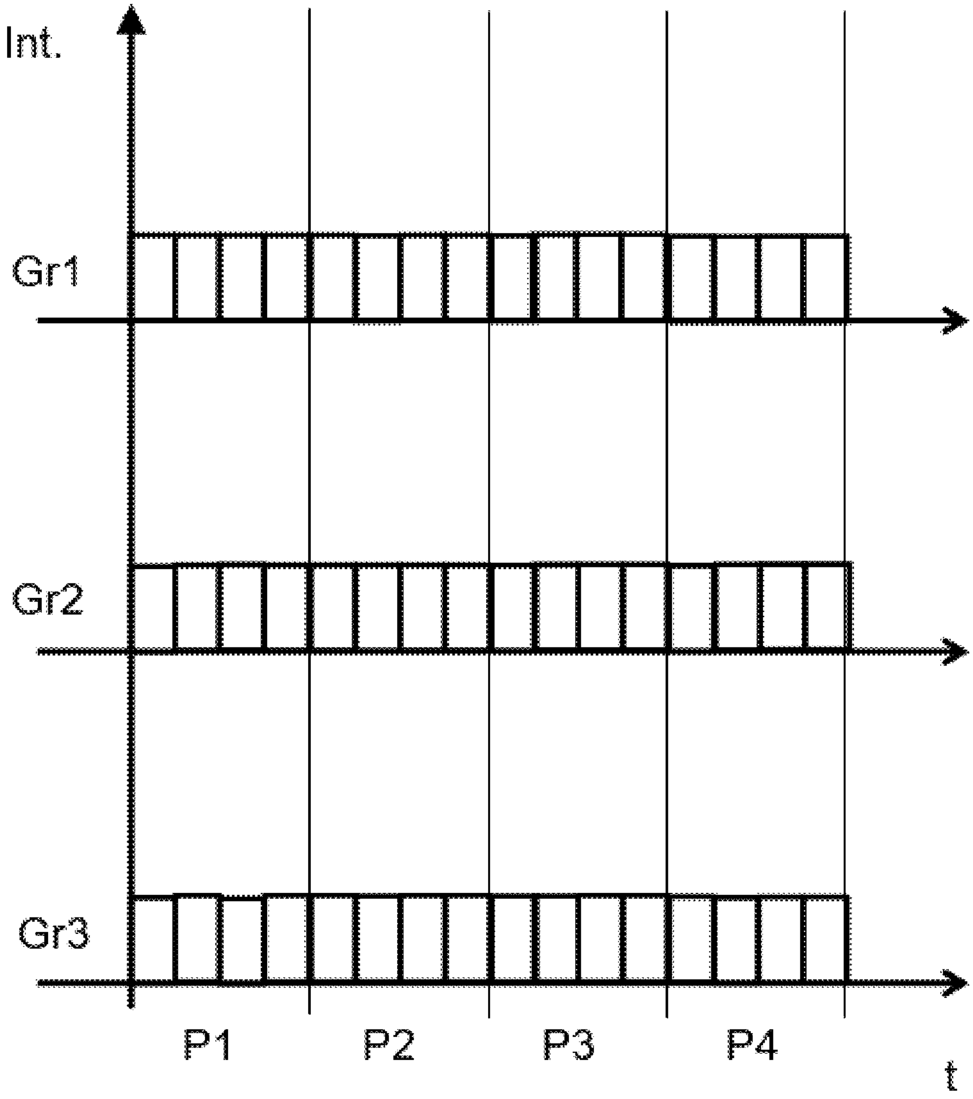
FIGS. 3 and 4 illustrate schemes for controlling groups via PWM.

FIG. 3 illustrates a scheme for controlling the groups via PWM, wherein in each of the regular PWM periods P1, P2, P3 and P4, each group is at maximum intensity, i.e., the duty cycle within each period is 100% for each group (where the duty cycle is discretized into four options, as indicated with the four rectangles for each group in each period). The scheme in FIG. 3 corresponds to the light fixture in FIG. 2.

In each of the illustrations of schemes for controlling the groups via PWM, such as in FIGS. 3, 4, 7 and 9, the horizontal axis denotes time t and the vertical axis indicated intensity Int. and furthermore indicates/separates the (spatially separated) groups Gr1, Gr2, Gr3.

Figure 4:
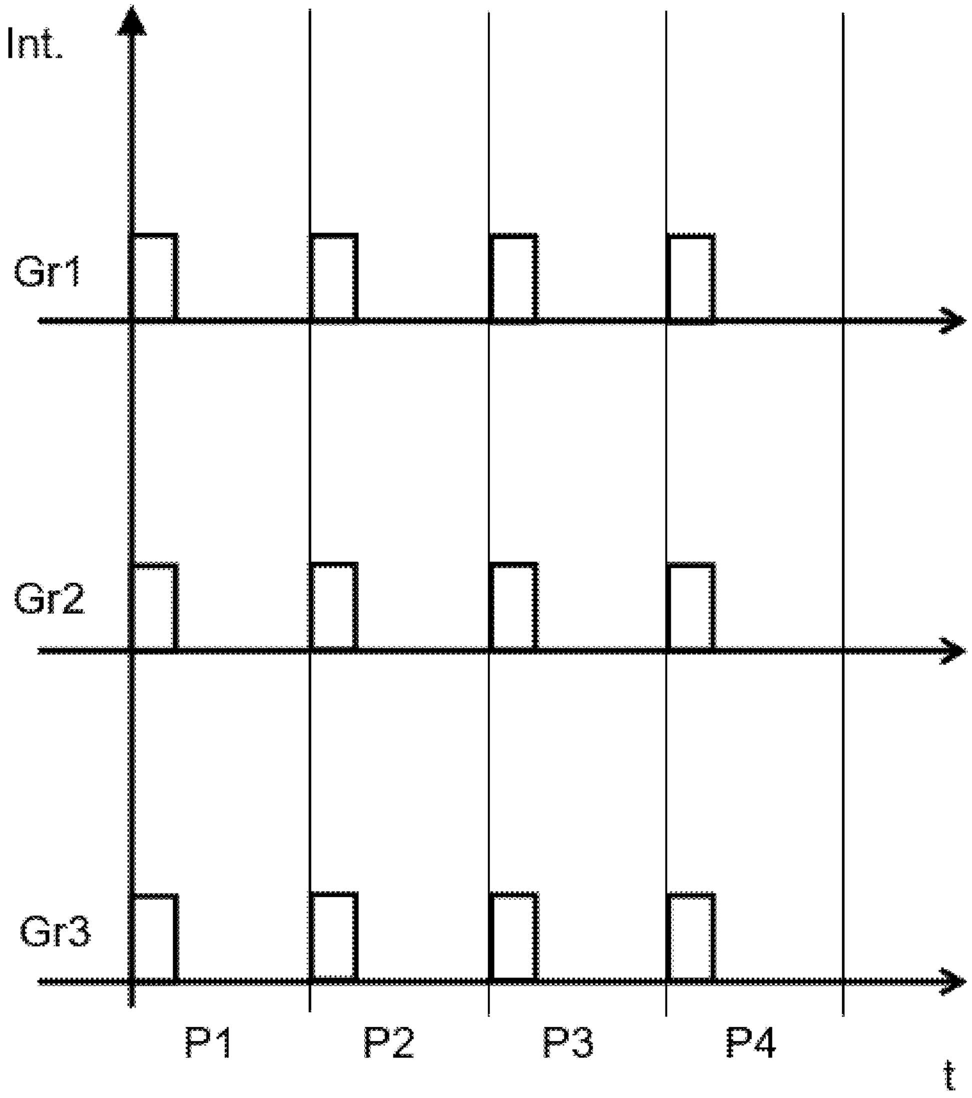

FIG. 4 illustrates a scheme for controlling the groups via PWM for achieving the minimum intensity achievable with the minimum pulse width in each regular PWM period, wherein in each of the regular PWM periods P1, P2, P3 and P4, each group is at minimum (non-zero) intensity, i.e., the duty cycle within each period is 25% for each group. The scheme in FIG. 4 corresponds to the light fixture in FIG. 5.

Figure 5:
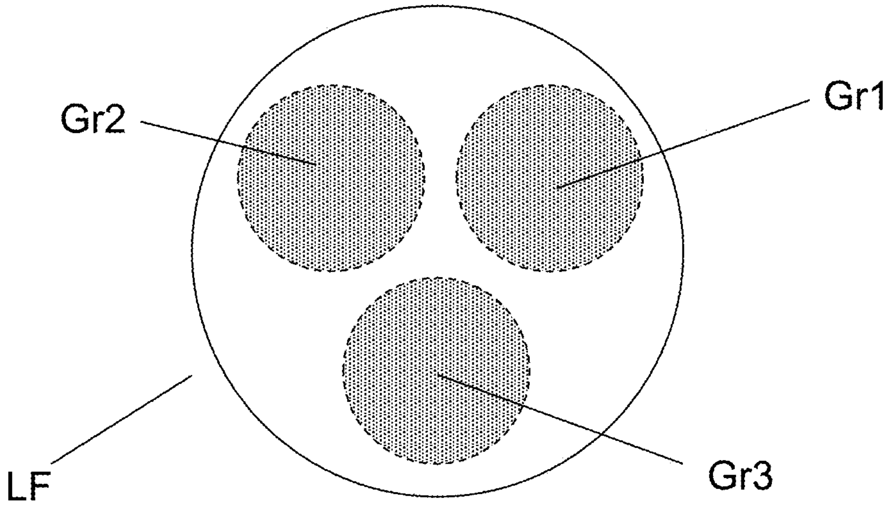
FIGS. 5 and 6 show additional schematics of light fixtures.

FIG. 5 shows the same light fixture LF as in FIGS. 1-2, but in FIG. 5 all light sources are switched on at minimum intensity (thus the dark grey pattern in the circles representing of the groups).

Figure 6:
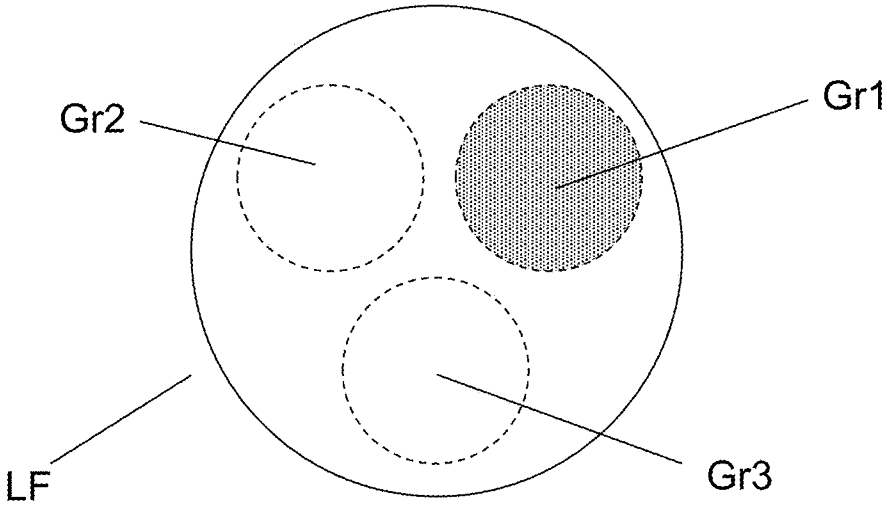

FIG. 6 shows the same light fixture LF as in FIGS. 1, 2 and 5, but in FIG. 6 only group Gr1 is switched on and it is switched on at minimum intensity (thus the dark grey pattern in the circle representing that group Gr1). The spatially averaged intensity is thus merely one third of the ("nominal") minimum intensity as depicted in FIGS. 4-5, but the light fixture is not homogeneously illuminated, which inhomogeneity may be observable by an observer, such as a human observer, e.g., by looking directly into or at the light fixture, at the resulting light (mid-air) or at an object, such as a surface, upon which the light is incident.

Figure 7:
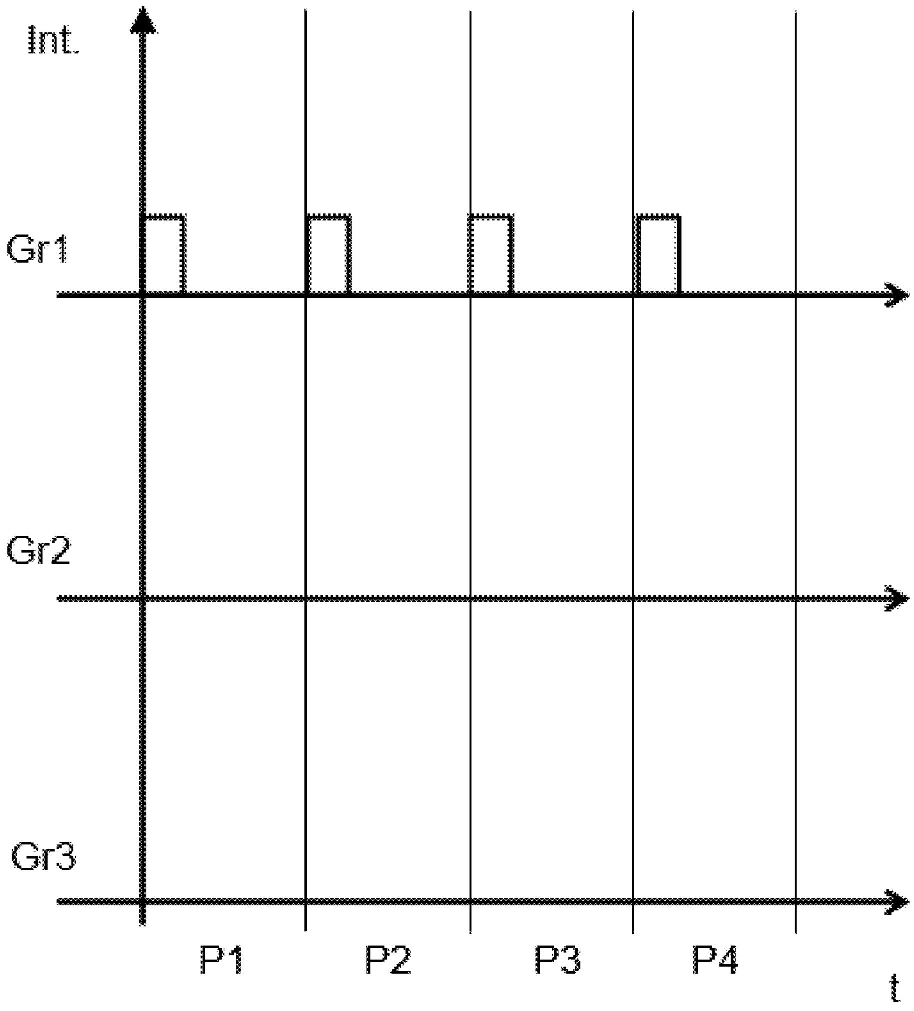
FIG. 7 illustrates an additional scheme for controlling groups via PWM.

FIG. 7 illustrates a scheme for controlling the groups via PWM for achieving the spatially averaged sub-minimum intensity depicted in FIG. 6, wherein in each of the regular PWM periods P1, P2, P3 and P4, the first group Gr1 is at minimum (non-zero) intensity, i.e., the duty cycle within each period is 25%, and the other groups Gr2, Gr3 are switched completely off in each period.

Figure 8:
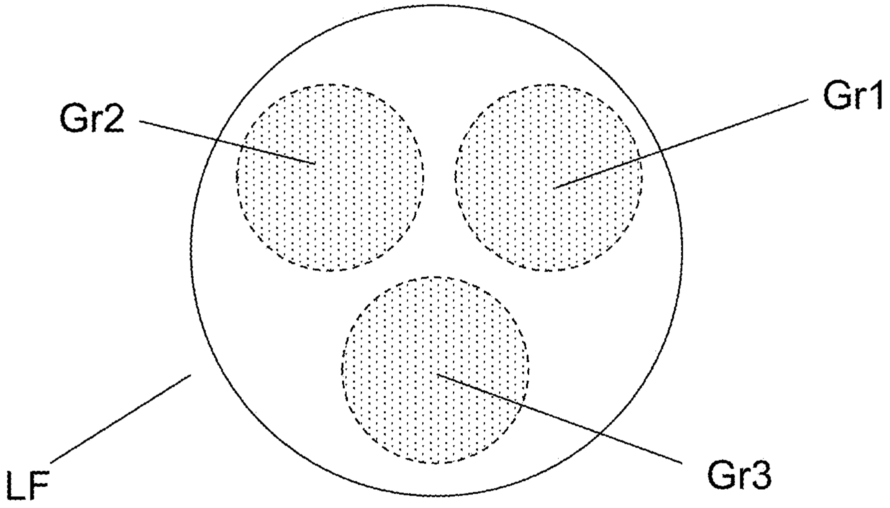
FIG. 8 shows an additional schematic for a light fixture.

FIG. 8 shows the same light fixture LF as in FIGS. 1, 2, 5, and 6, but in FIG. 8 all groups Gr1, Gr2, Gr3 are controlled according to a scheme (illustrated in FIG. 9) according to which each group Gr1 is repeatedly switched on and off so as to have a time averaged intensity being less than the minimum intensity of, e.g., the first group Gr1 in FIGS. 6-7 (thus the light grey pattern in the circles representing each group). Thus, while a "sub-minimum" intensity is achieved, the light fixture remains homogeneously illuminated as observable by an observer, such as a human observer, e.g., by looking directly into or at the light fixture, at the resulting light (mid-air) or at an object, such as a surface, upon which the light is incident.

Figure 9:
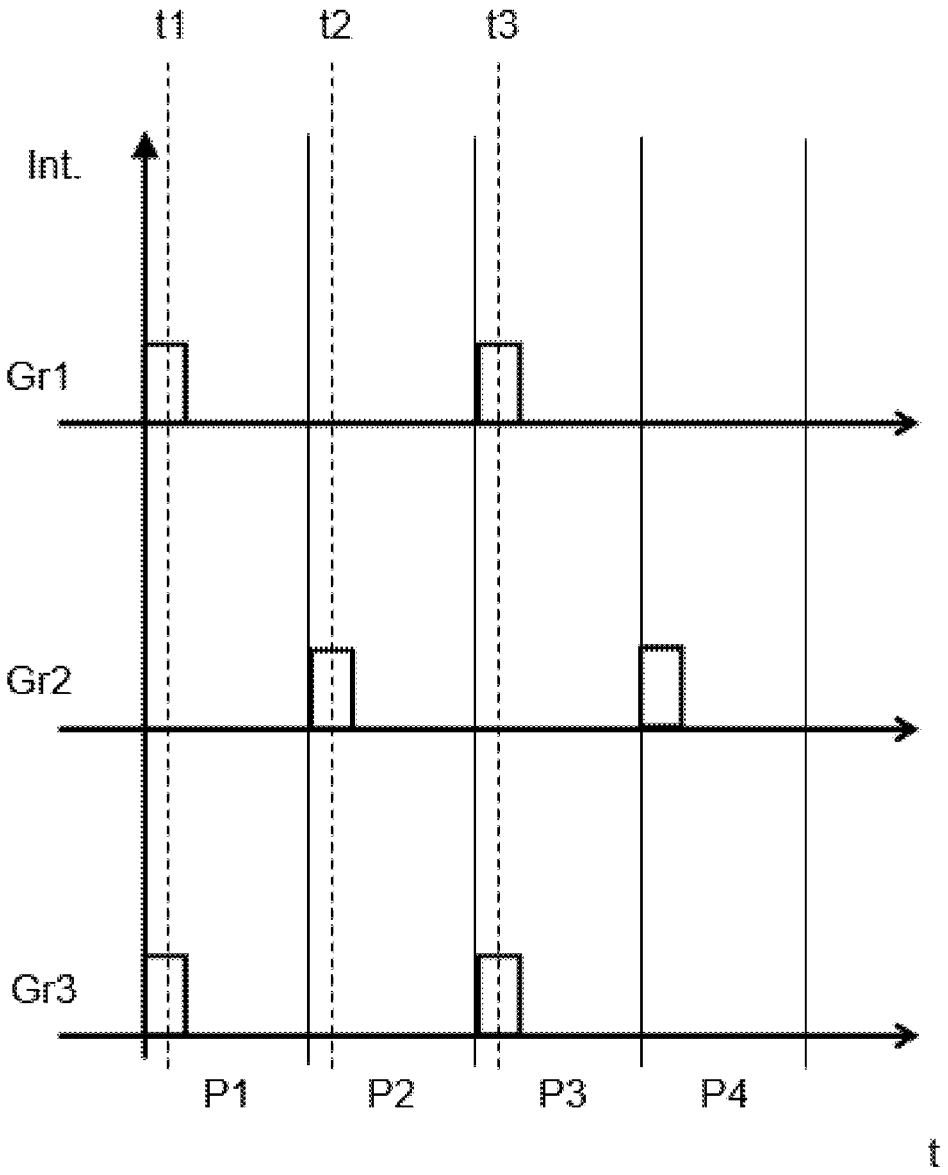
FIGS. 9 and 10 illustrate additional schemes for controlling groups via PWM.

FIG. 9 illustrates a scheme for controlling the groups via PWM for achieving the homogeneous sub-minimum intensity depicted in FIG. 8 wherein each of the groups is repeatedly switched on and off, and wherein 1. at a first point t1 in time,
   i. the first group Gr1 and the third group Gr3 are switched on, and
   ii. the second group Gr2 is switched off,
2. at a second point in time,
   i. the first group Gr1 and the third group Gr3 are switched off, and
   ii. the second group Gr2 is switched on, and
3. at a third point in time,
   i. the first group Gr1 and the third group Gr3 are switched on, and
   ii. the second group Gr2 is switched off, wherein a period of time between the first point in time and the third point in time is equal to or less than 1/10 s, thus in each of the regular PWM periods P1, P2, P3 and P4, and at each of the time points t1, t2, t3, at least one group is switched off and each group is at a time averaged intensity being sub-minimum, i.e., the duty cycle within each period is on average less than 25%. However, to an observer, such a human observer, the light fixture appears homogeneously and constantly lit at the sub-minimum intensity.

Figure 10:
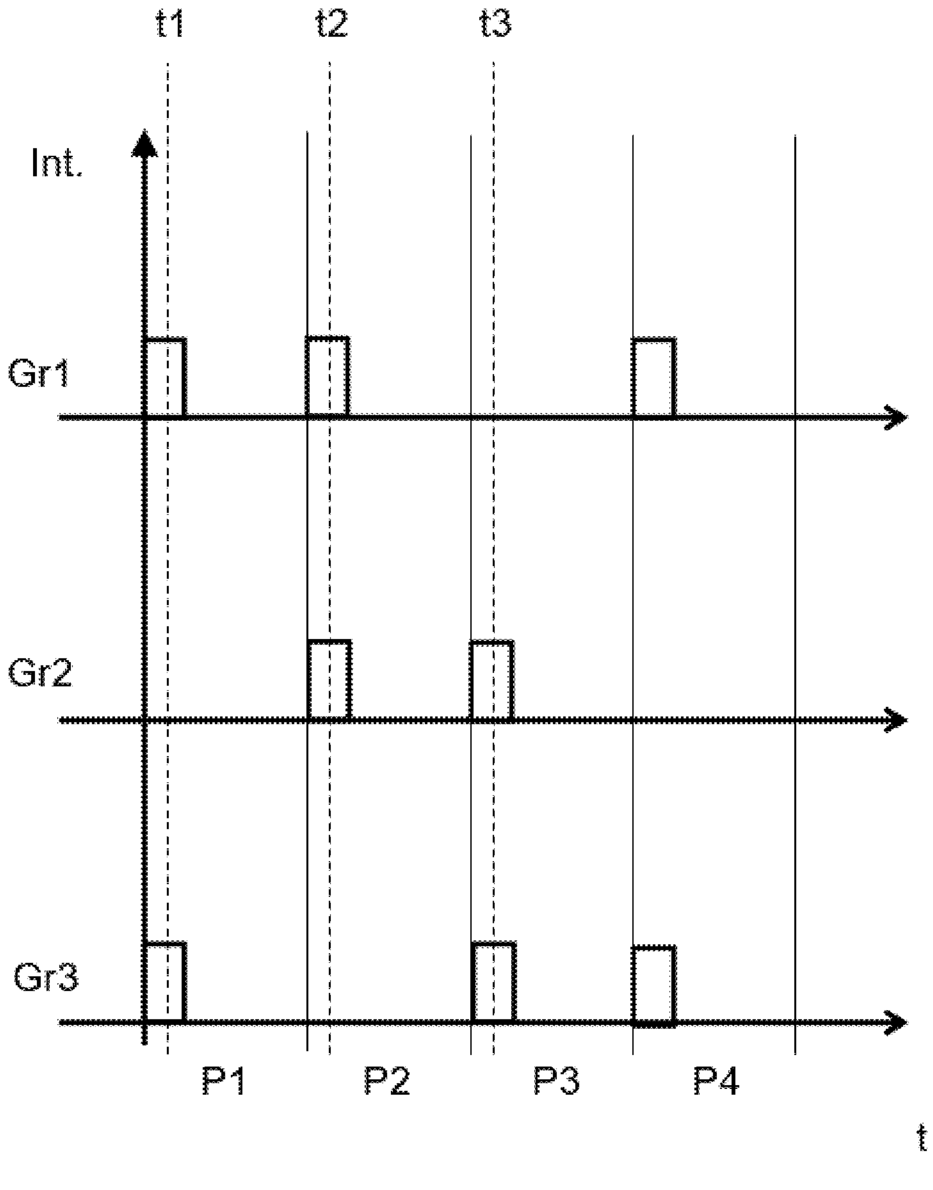

FIG. 10 illustrates a scheme for controlling the groups via PWM for achieving a homogeneous sub-minimum intensity similar to, albeit slightly brighter (i.e., having higher intensity) than depicted in FIG. 8 (or resulting from the scheme in FIG. 9) wherein each of the groups is repeatedly switched on and off, and wherein 1. at a first point t1 in time,
   i. the first group Gr1 and the third group Gr3 are switched on, and
   ii. the second group Gr2 is switched off,
2. at a second point in time,
   i. the first group Gr1 and the second group Gr2 (which second group Gr2 was switched off at the first point t1 in time) are switched on, and
   ii. the third group Gr3 (which was switched on at the first point t1 in time) is switched off,
3. at a third point in time,
   i. the second group Gr2 and the third group Gr3 (which third group Gr3 was switched off at the second point t2 in time) are switched on, and
   ii. the first group Gr1 (which was switched on at the second point t2 in time) is switched off, and
4. at a fourth point in time,
   i. the first group Gr1 (which first group Gr1 was switched off at the third point t3 in time) and the third group Gr3 are switched on, and
   ii. the second group Gr2 (which was switched on at the third point t3 in time) is switched off, and wherein a period of time between the first point in time and the third point in time and/or between the second point in time and the fourth point in time is equal to or less than 1/10 s, thus in each of the regular PWM periods P1, P2, P3 and P4, and at each of the time points t1, t2, t3, at least one group is switched off and each group is at a time averaged intensity being sub-minimum, i.e., the duty cycle within each period is on average less than 25%. However, to an observer, such a human observer, the light fixture appears homogeneously and constantly lit at the sub-minimum intensity. In the scheme according to FIG. 10, there are in all periods 1 group OFF and 2 groups ON (i.e., an output is in each and every period ⅔ of the nominal minimum intensity) and output is evenly distributed in space over any 3 consecutive periods. Each group is controlled according to a periodical function (such as a function with a function-period spanning 3 PWM-periods, with every third period being OFF and the remaining periods being ON at minimum intensity), with the periodical functions being identical to each other (and then each having a unique phase-shift, i.e., each function having a non-zero phase shift with respect to each of the other functions). It may be understood that the scheme is a repetitive scheme, such as repeating scheme-periods P1-P3, such as period P4 (with the ON-OFF pattern of groups Gr1-Gr3 being identical to the pattern of period P1) being the start of a new scheme-period. For the embodiment in FIG. 10, a total intensity of the plurality of groups is constant across regular intervals of the pulse width modulation.

Figure 11:
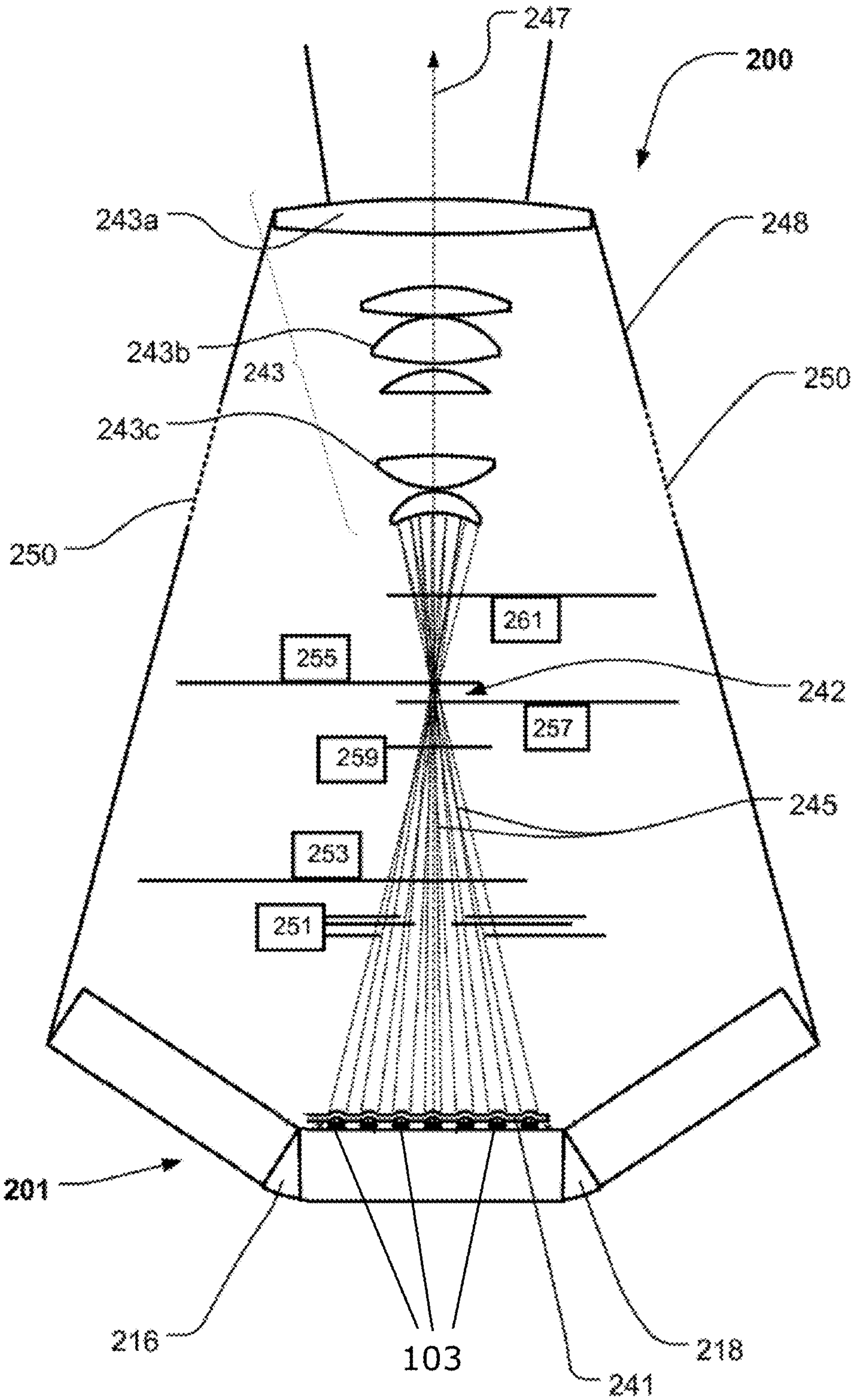
FIG. 11 illustrates a structural diagram of an illumination device.

FIG. 11 illustrates a structural diagram of an illumination device 200 (wherein "illumination device" and "light fixture" may be used interchangeably throughout the present application). The illumination device comprises a cooling module 201 comprising a plurality of LEDs 103 (which could in an alternative embodiment be one or more discharge bulbs), a light collector 241, an optical gate 242 and an optical projecting and zoom system 243. The cooling module is arranged in the bottom part of a lamp housing 248 of the illumination device and the other components are arranged inside the lamp housing 248. The lamp housing 248 can be provided with a number of openings 250. The light collector 241 is adapted to collect light from the LEDs 103 and to convert the collected light into a plurality of light beams 245 (dotted lines) propagating along an optical axis 247 (dash-dotted line). The light collector can be embodied as any optical means capable of collecting at least a part of the light emitted by the LEDs and convert the collected light to a light beams. In the illustrated embodiment the light collector comprises a number of lenslets each collecting light from one of the LEDs and converting the light into a corresponding light beam. However it is noticed that the light collector also can be embodied a single optical lens, a Fresnel lens, a number of TIR lenses (total reflection lenses), a number of light rods or combinations thereof. It is understood that light beams propagating along the optical axis contain rays of light propagating at an angle, e.g. an angle less that 45 degrees to the optical axis. The light collector may be configured to fill the optical the gate 242 with light from the light sources 103 so that the area, i.e. the aperture, of the gate 242 is illuminated with a uniform intensity or optimized for max output. The gate 242 is arranged along the optical axis 247. The optical projecting system 243 may be configured to collect at least a part of the light beams transmitted through the gate 242 and to image the optical gate at a distance along the optical axis. For example, the optical projecting system 243 may be configured to image the gate 242 onto some object such as a screen, e.g. a screen on a concert stage. A certain image, e.g. some opaque pattern provided on a transparent window, an open pattern in a non-transparent material, or imaging object such as GOBOs known in the field of entertainment lighting, may be contained within the gate 242 so that that the illuminated image can be imaged by the optical projecting system. Accordingly, the illumination device 200 may be used for entertainment lighting. In the illustrated embodiment the light is directed along the optical axis 247 by the light collector 241 and passes through a number of light effects before exiting the illumination device through a front lens 243*a*. The light effects can for instance be any light effects known in the art of intelligent/entertainments lighting for instance, a CMY subtractive color mixing system 251, color filters 253, gobos 255, animation effects 257, iris effects 259, a focus lens group 243*c*, zoom lens group 243*b*, prism effect 261, framing effects (not shown), or any other light effects known in the art. The mentioned light effects only serves to illustrate the principles of an illuminating device for entertainment lighting and the person skilled in the art of entertainment lighting will be able to construct other variations with additional are less light effects. Further it is noticed that the order and positions of the light effects can be changed.

Figure 12:
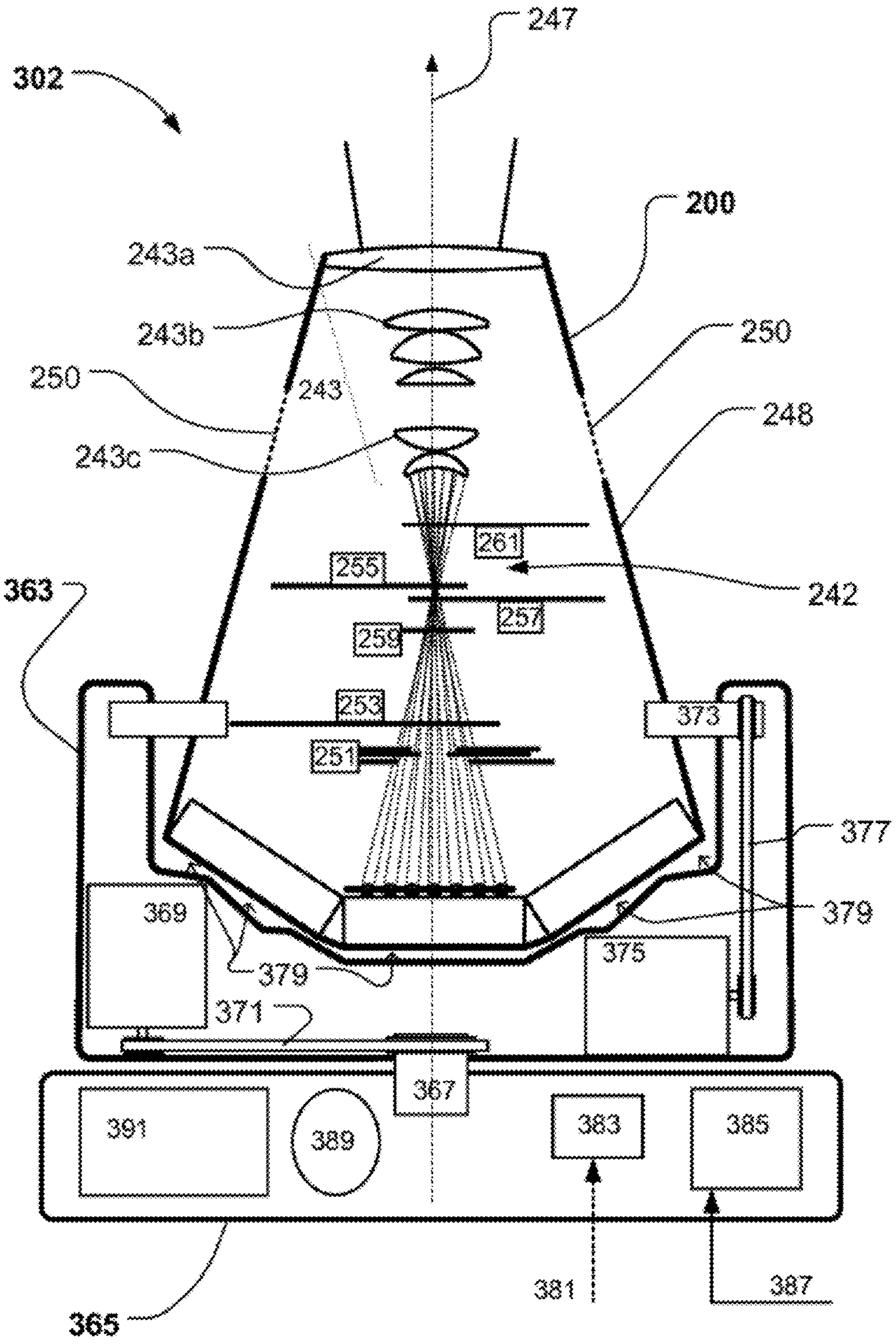
FIG. 12 illustrates a structural diagram of a moving head light fixture.

FIG. 12 illustrates a structural diagram of a moving head light fixture 302 comprising a head 200 rotatable connected to a yoke 363 where the yoke is rotatable connected to a base 365. The head is substantially identical to the illumination device shown in FIG. 2 and substantial identical features are labeled with the same reference numbers as in FIG. 11 and will not be described further. The moving head light fixture comprises pan rotating means for rotating the yoke in relation to the base, for instance by rotating a pan shaft 367 connected to the yoke and arranged in a bearing (not shown) in the base). A pan motor 369 is connected to the shaft 367 through a pan belt 371 and is configured to rotate the shaft and yoke in relation to the base through the pan belt. The moving head light fixture comprises tilt rotating means for rotating the head in relation to the yoke, for instance by rotating a tilt shaft 373 connected to the head and arranged in a bearing (not shown) in the yoke). A tilt motor 375 is connected to the tilt shaft 373 through a tilt belt 377 and is configured to rotate the shaft and head in relation to the yoke through the tilt belt. The skilled person will realize that the pan and tilt rotation means can be constructed in many different ways using mechanical components such as motors, shafts, gears, cables, chains, transmission systems, bearings etc. Alternatively it is noticed that it also is possible to arrange the pan motor in the base and/or arrange the tilt motor in the head. The space 379 between the yoke and the bottom part of the head is limited as the moving head light fixture is designed to be as small as possible. As known in the prior art the moving head light fixture receives electrical power 381 from an external power supply (not shown). The electrical power is received by an internal power supply 383 which adapts and distributes electrical power through internal power lines (not shown) to the subsystems of the moving head. The internal power system can be constructed in many different ways for instance by connecting all subsystems to the same power line. The skilled person will however realize that some of the subsystems in the moving head need different kind of power and that a ground line also can be used. The light source will for instance in most applications need a different kind of power than step motors and driver circuits. The light fixture comprises also a controller 385 which controls the components (other subsystems) in the light fixture based on an input signal 387 indicative light effect parameters, position parameters and other parameters related to the moving head lighting fixture. The controller receives the input signal from a light controller (not shown) as known in the art of intelligent and entertainment lighting for instance by using a standard protocol like DMX, Art-NET, RDM etc. Typically the light effect parameter is indicative of at least one light effect parameter related to the different light effects in the light system. The controller 385 is adapted to send commands and instructions to the different subsystems of the moving head through internal communication lines (not shown). The internal communication system can be based on a various type of communications networks/systems. The moving head can also comprise user input means enabling a user to interact directly with the moving head instead of using a light controller to communicate with the moving head. The user input means 389 can for instance be bottoms, joysticks, touch pads, keyboard, mouse etc. The user input means can also be supported by a display 391 enabling the user to interact with the moving head through a menu system shown on the display using the user input means. The display device and user input means can in one embodiment also be integrated as a touch screen.

Although the present disclosure has been described in connection with the specified embodiments, it should not be construed as being in any way limited to the presented examples. The scope of the present disclosure is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the disclosure. Furthermore, individual features mentioned in different claims, may possibly be advantageously combined, and the mentioning of these features in different claims does not exclude that a combination of features is not possible and advantageous.

What is claimed is:

1. A method of operating a light fixture comprising a plurality of light sources arranged in a plurality of groups, wherein each group comprises one or more light sources, the method comprising:

controlling the plurality of groups so that each of the groups is repeatedly switched on and off according to a repeating pattern, the repeating pattern including at least three different combinations of which of the plurality of groups is switched on and which of the plurality of groups is switched off, wherein each of the at least three different combinations is repeated at least once every 1/10 s.

2. The method of claim 1, wherein:

in a first combination of the repeating pattern, one or more groups are switched on and other one or more groups are switched off;

in a second combination of the repeating pattern, one or more of the groups which are switched on in the first combination are switched off and one or more of the groups switched off in the first combination are switched on; and in a third combination of the repeating pattern, one or more of the groups which are switched on in the second combination are switched off and one or more of the groups switched off in the second combination are switched on.

3. The method of claim 1, wherein a moving average of an intensity of one or more of the groups is substantially constant over a period of time spanning 10 seconds or more.

4. The method of claim 1, wherein a moving average of a total intensity of all of the groups is substantially constant over a period of time spanning 10 seconds or more.

5. The method of claim 1, wherein which of the plurality of groups is switched on is different for each combination of the repeating pattern.

6. The method of claim 1, wherein each of the plurality of groups that is switched on in a first combination of the repeating pattern are switched on with a variable intensity that is less than half a maximum intensity.

7. The method of claim 1, wherein each of the plurality of groups that is switched on in a first combination of the repeating pattern are switched on with a minimum intensity.

8. The method of claim 1, wherein in each combination of the repeating pattern, at least one of the plurality of groups is switched off.

9. The method of claim 1, wherein each combination of the repeating pattern is maintained for a same duration.

10. The method of claim 1, wherein groups within the plurality of groups are out-of-phase with each other.

11. The method of claim 1, further comprising controlling an intensity of each group of the plurality of groups via pulse-width modulation.

12. A light fixture system comprising:

a light fixture comprising:

a plurality of light sources arranged in a plurality of groups, wherein each group comprises one or more light sources, and a controller, wherein the controller is configured to control the plurality of groups so that each of the groups is repeatedly switched on and off according to a repeating pattern, the repeating pattern including at least three different combinations of which of the plurality of groups is switched on and which of the plurality of groups is switched off, and wherein each of the at least three different combinations is repeated at least once every 1/10 s.

13. The light fixture system of claim 12, wherein which of the plurality of groups is switched on is different for each combination of the repeating pattern.

14. The light fixture system of claim 12, wherein each of the plurality of groups that is switched on in a first combination of the repeating pattern are switched on with a variable intensity that is less than half of a maximum intensity.

15. The light fixture system of claim 12, wherein each of the plurality of groups that is switched on in a first combination of the repeating pattern are switched on with a minimum intensity.

16. The light fixture system of claim 12, wherein in each combination of the repeating pattern, at least one of the plurality of groups is switched off.

17. The light fixture system of claim 12, wherein the light fixture is a moving head.

18. The light fixture system of claim 12, wherein a moving average of an intensity of one or more of the groups is substantially constant over a period of time spanning 10 seconds or more.

19. The light fixture system of claim 12, wherein a moving average of a total intensity of all of the groups is substantially constant over a period of time spanning 10 seconds or more.

20. A non-transitory computer readable medium storing instructions that, when executed by a controller of a light fixture system comprising a light figures having a plurality of light sources arranged in a plurality of groups, wherein each group comprises one or more light sources, configure the controller to perform the steps of:

controlling the plurality of groups so that each of the groups is repeatedly switched on and off according to a repeating pattern, the repeating pattern including at least three different combinations of which of the plurality of groups is switched on and which of the plurality of groups is switched off, wherein each of the at least three different combinations is repeated at least once every 1/10 s.

* * * * *